US 008804756B2

(12) United States Patent
Tseng

(10) Patent No.: US 8,804,756 B2
(45) Date of Patent: Aug. 12, 2014

(54) METHOD AND APPARATUS FOR IMPROVING INTERACTION BETWEEN SCHEDULING REQUEST PROCEDURE AND RANDOM ACCESS PROCEDURE

(75) Inventor: Li-Chih Tseng, Taipei (TW)

(73) Assignee: Innovative Sonic Limited, Ebene (MU)

( * ) Notice: Subject to any disclaimer, the term of this patent is extended or adjusted under 35 U.S.C. 154(b) by 749 days.

(21) Appl. No.: 12/556,553

(22) Filed: Sep. 9, 2009

(65) Prior Publication Data
US 2010/0080184 A1    Apr. 1, 2010

Related U.S. Application Data

(60) Provisional application No. 61/101,153, filed on Sep. 30, 2008.

(51) Int. Cl.
*H04J 3/16* (2006.01)
(52) U.S. Cl.
USPC .......................................... 370/437; 370/329
(58) Field of Classification Search
CPC ..... H04W 88/06; H04W 76/00; H04W 72/04; H04W 72/0406; H04W 72/0413; H04W 72/042; H04W 72/044; H04W 72/12; H04W 72/1278; H04L 5/003
USPC .................. 370/310, 328, 329, 431, 433, 437
See application file for complete search history.

(56) References Cited

U.S. PATENT DOCUMENTS

| 7,778,217 | B2 * | 8/2010 | Lee et al. ................. 370/328 |
| 2008/0192674 | A1 * | 8/2008 | Wang et al. .............. 370/315 |
| 2009/0197610 | A1 * | 8/2009 | Chun et al. ............... 455/450 |
| 2009/0280798 | A1 * | 11/2009 | Meylan et al. ............ 455/422.1 |
| 2010/0040028 | A1 * | 2/2010 | Maheshwari et al. ..... 370/336 |
| 2010/0202380 | A1 * | 8/2010 | Park et al. ................. 370/329 |

FOREIGN PATENT DOCUMENTS

| KR | 1020090082867 A | 7/2009 |
| KR | 1020090116590 A | 11/2009 |
| TW | 201014424 A | 4/2010 |

OTHER PUBLICATIONS

TSG-RAN WG2 Meeting #63bis R2-085388 Prague, Czech Republic, Sep. 29-Oct. 3, 2008 D-SR failure handling.*
3GPP TSG-RAN WG2 #63bis meeting, Prague, The Czech Republic, Sep. 29-Oct. 3. 2008 (R2-085612).
3GPP TSG-RAN WG2 #63bis, Prague, Czech Republic, Sep. 29-Oct. 3, 2003 (R2-085397).
Mac Rapporteurs et al: "E-UTRA MAC protocol specification update" 3GPP Draft TSG-RAN2 Meeting #61, R2-081389, Feb. 11-15, 2008, [paragraph 5.4-paragraph 5.4.2.2], XP050139110.

(Continued)

*Primary Examiner* — Chi Pham
*Assistant Examiner* — Weibin Huang
(74) *Attorney, Agent, or Firm* — Blue Capital Law Firm, P.C.

(57) ABSTRACT

The present invention provides a method for improving interaction between a Scheduling Request procedure and a Random Access procedure in a user equipment (UE) of a wireless communication system. The method includes steps of triggering a Scheduling Request procedure; repeatedly sending a Dedicated Scheduling Request (D-SR) message on a Physical Uplink Control Channel (PUCCH) until an uplink transmission resource for a new transmission is received or the number of D-SR transmissions reaches to a specific value when the PUCCH is configured for the UE; and deactivating all pre-configured transmission resources before performing a Random Access procedure corresponding to the Scheduling Request procedure when the number of D-SR transmissions reaches to the specific value.

8 Claims, 6 Drawing Sheets

(56) References Cited

OTHER PUBLICATIONS

LG Electronics Inc.: "Limit endless SR transmission" 3GPP Draft TSG-RAN WG2 #62bis, R2-083436, pp. 1-2, Jun. 30-Jul. 4, 2008, XP050140825.

Nokia Corporation et al: "Missing details of semi-persistent scheduling for UL" 3GPP Draft TSG-RAN WG2 Meeting #63bis, R2-085070, Sep. 29-Oct. 3, 2008, [paragraph 2-paragrapf 2.1], XP050320014.

Asustek: "Handling of UL transmission on D-SR failure" 3GPP Draft TSG-WG2 Meeting #65bis, R2-092294, Mar. 23-27, 2009, XP050340061.

3GPP, R2-085388, Sep. 2008.

3GPP, R2-085389, Sep. 2008.

Notice of Allowance on corresponding foreign Patent Application (KR 10-2009-0089568) issued on Aug. 26, 2011.

TSG-RAN WG2 Meeting #63bis, Prague, Czech Republic; Sep. 29-Oct. 3, 2008, R2-085388 (updated R2-084006).

Office Action on corresponding foreign application (JP2009-206300) from JPO dated Nov. 29, 2011.

* cited by examiner

METHOD AND APPARATUS FOR IMPROVING INTERACTION BETWEEN SCHEDULING REQUEST PROCEDURE AND RANDOM ACCESS PROCEDURE

CROSS REFERENCE TO RELATED APPLICATIONS

This application claims the benefit of U.S. Provisional Application No. 61/101,153, filed on Sep. 30, 2008 and entitled "Interaction between dedicated Scheduling Request and Random Access procedure", the contents of which are incorporated herein by reference.

BACKGROUND OF THE INVENTION

1. Field of the Invention

The present invention relates to a method and apparatus for improving interaction between a Scheduling Request procedure and a Random Access procedure, and more particularly, to a method and apparatus for improving interaction between a Scheduling Request procedure and a Random Access procedure in a user equipment (UE) of a wireless communication system, so as to avoid uplink transmission error or failure of the Random Access procedure when the Random Access procedure is triggered by the Scheduling Request procedure.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE system, the network, such as an evolved Node B (eNB), performs radio resource allocation to provide user equipments (UEs) with resources for uplink or downlink data transfer. There are two kinds of resource allocations: dynamic resource allocation and pre-configured resource allocation. For the pre-configured resource allocation, the network allocates resource to the UEs by Radio Resource Control (RRC) signaling, and allows the UEs periodically transmitting a certain amount of data, for example, voice data. That means, at periodic time intervals, the UEs can utilize the pre-configured radio resources for data transmission or reception, to achieve data exchange with the network. On the other hand, for the dynamic resource allocation, the network dynamically allocates radio resources to the UEs depending on UE number of the cell area, traffic volume and quality of service (QoS) requirements of each UE, and the UE has to monitor a physical downlink control channel (PDCCH) to find possible allocation of dynamic resources for both downlink and uplink transmission.

Besides, for the dynamic resource allocation, when the UE has new uplink data to transmit and there is no Uplink Shared Channel (UL-SCH) resource available, the UE shall trigger a Scheduling Request (SR) procedure to request the network to allocate uplink transmission resources. In such a situation, if the UE has configured Physical Uplink Control Channel (PUCCH) resources, the SR procedure is performed via PUCCH signaling. Otherwise, such as the UE has no configured PUCCH resources or the configured PUCCH resources are invalid, for example, the SR procedure is then performed via a Random Access Procedure. Since the PUCCH resources are dedicated transmission resources, the SR message transmitted on PUCCH is referred to as a Dedicated Scheduling Request (D-SR) message, while the SR message transmitted via the Random Access procedure is referred to as an Random Access Scheduling Request (RA-SR) message.

According to current specifications, if the UE has a configured PUCCH resource after the SR procedure is triggered, the UE shall periodically transmit a D-SR message on PUCCH until an uplink transmission resource for a new transmission is received or the number of D-SR transmissions reaches to a pre-defined parameter DSR_TRANS_MAX. When the number of D-SR transmissions reaches to the pre-defined parameter DSR_TRANS_MAX, it indicates uplink transmission of the UE may have some problem, such as the PUCCH resources become invalid or the UE loses synchronization on uplink timing, and thus the D-SR messages sent by the UE cannot be successfully received by the network. In this case, the UE shall stop the D-SR transmission, release all configured PUCCH resources, and trigger a Random Access procedure to transmit the SR message instead. Note that the pre-defined parameter DSR_TRANS_MAX is configured by RRC signaling.

However, if the UE already has pre-configured transmission resources, such as Semi-Persistent Scheduling (SPS) resources, when the number of D-SR transmissions reaches to the pre-defined parameter DSR_TRANS_MAX, since some problem may already occur on uplink transmission of the UE, continuing using the pre-configured resources to perform uplink transmission may cause transmission failure or interference to other UE's transmission. Moreover, when the UE switches to use the Random Access procedure to transmit the SR message, the pre-configured resources may collide with UL-SCH resources carried by Message 2 (Msg 2) of the Random Access procedure. As a result, Message 3 (Msg 3) of the RA procedure may misuse the pre-configured resource for transmission, and cause failure of the Random Access procedure which makes the UE unable to obtain the uplink transmission resources.

SUMMARY OF THE INVENTION

It is therefore an objective of the present invention to provide a method and apparatus for improving interaction between a Scheduling Request procedure and a Random Access procedure in a user equipment (UE) of a wireless communication system.

According to the present invention, a method for improving interaction between a Scheduling Request procedure and a Random Access procedure in a user equipment (UE) of a wireless communication system is disclosed. The method includes steps of triggering a Scheduling Request procedure; sending a Dedicated Scheduling Request (D-SR) message on a Physical Uplink Control Channel (PUCCH) repeatedly until an uplink transmission resource for a new transmission is received or the number of D-SR transmissions reaches to a specific value when the UE has a configured PUCCH resource; and deactivating all pre-configured transmission resources allocated to the UE before performing a Random Access procedure corresponding to the Scheduling Request procedure when the number of D-SR transmissions reaches to the specific value.

According to the present invention, a communications device for improving interaction between a Scheduling Request procedure and a Random Access procedure in a user equipment (UE) of a wireless communication system is disclosed. The communications device includes a processor for executing a program, and a memory, coupled to the processor, for storing the program. The program includes steps of triggering a Scheduling Request procedure; sending a Dedicated Scheduling Request (D-SR) message on a Physical Uplink Control Channel (PUCCH) repeatedly until an uplink transmission resource for a new transmission is received or the number of D-SR transmissions reaches to a specific value when the UE has a configured PUCCH resource; and deactivating all pre-configured transmission resources allocated to the UE before performing a Random Access procedure corresponding to the Scheduling Request procedure when the number of D-SR transmissions reaches to the specific value.

According to the present invention, a method for improving interaction between a Scheduling Request procedure and a Random Access procedure in a user equipment (UE) of a wireless communication system is disclosed. The method includes steps of triggering a Scheduling Request procedure; sending a Dedicated Scheduling Request (D-SR) message on a Physical Uplink Control Channel (PUCCH) repeatedly until an uplink transmission resource for a new transmission is received or the number of D-SR transmissions reaches to a specific value when the UE has a configured PUCCH resource; and flushing all Hybrid Automatic Repeat request (HARQ) buffers of the UE before performing a Random Access procedure corresponding to the Scheduling Request procedure when the number of D-SR transmissions reaches to the specific value.

According to the present invention, a communications device for improving interaction between a Scheduling Request procedure and a Random Access procedure in a user equipment (UE) of a wireless communication system is disclosed. The communications device includes a processor for executing a program, and a memory, coupled to the processor, for storing the program. The program includes steps of triggering a Scheduling Request procedure; sending a Dedicated Scheduling Request (D-SR) message on a Physical Uplink Control Channel (PUCCH) repeatedly until an uplink transmission resource for a new transmission is received or the number of D-SR transmissions reaches to a specific value when the UE has a configured PUCCH resource; and flushing all Hybrid Automatic Repeat request (HARQ) buffers of the UE before performing a Random Access procedure corresponding to the Scheduling Request procedure when the number of D-SR transmissions reaches to the specific value.

According to the present invention, a method for improving interaction between a Scheduling Request procedure and a Random Access procedure in a user equipment (UE) of a wireless communication system is disclosed. The method includes steps of triggering a Random Access procedure; and deactivating all pre-configured transmission resources allocated to the UE before performing the Random Access procedure.

According to the present invention, a communications device for improving interaction between a Scheduling Request procedure and a Random Access procedure in a user equipment (UE) of a wireless communication system is disclosed. The communications device includes a processor for executing a program, and a memory, coupled to the processor, for storing the program. The program includes steps of triggering a Random Access procedure; and deactivating all pre-configured transmission resources allocated to the UE before performing the Random Access procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
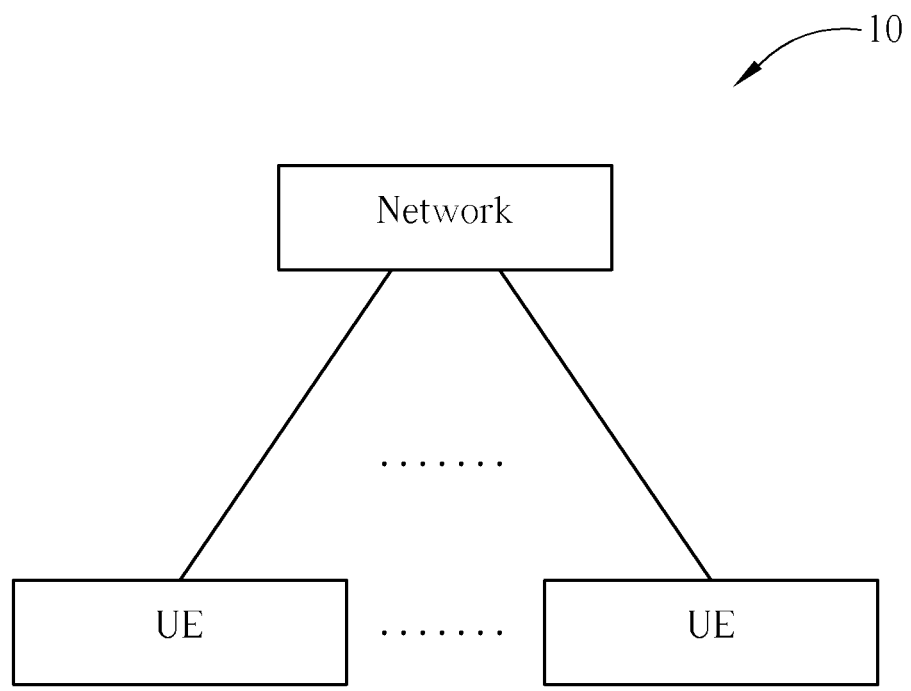
FIG. 1 is a schematic diagram of a wireless communications system.

Please refer to FIG. 1, which illustrates a schematic diagram of a wireless communications system 10. The wireless communications system 10 is preferred to be a Long Term Evolution (LTE) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
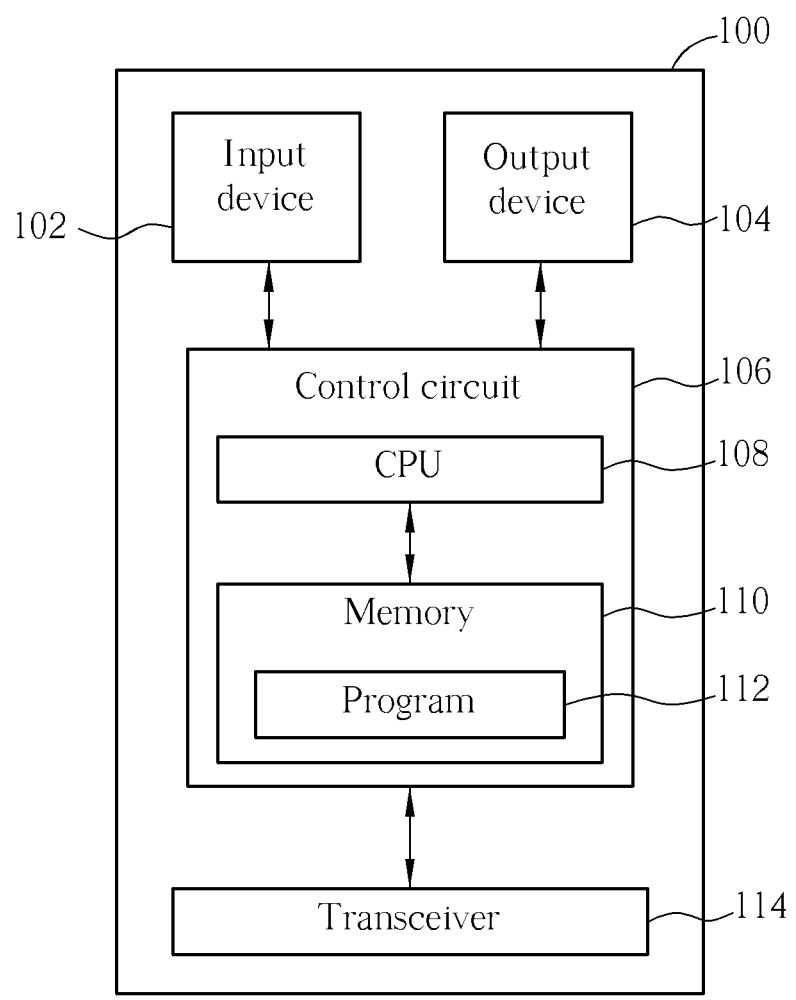
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
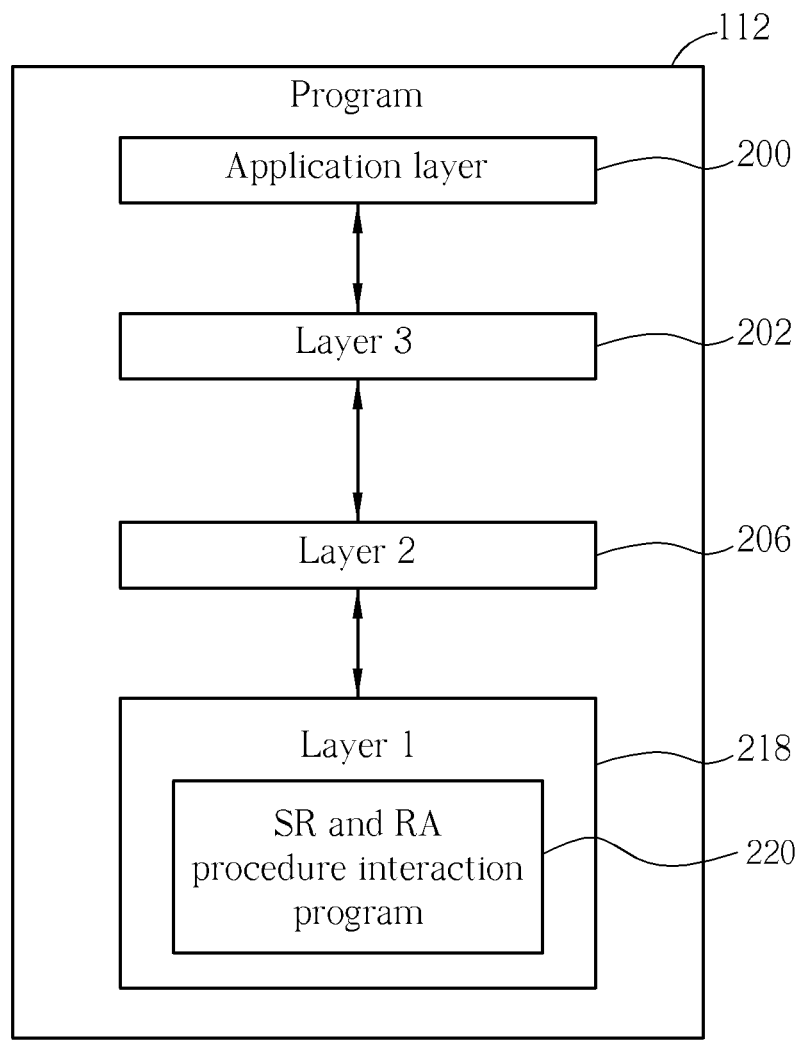
FIG. 3 is a diagram of program of FIG. 2.

Please continue to refer to FIG. 3. FIG. 3 is a schematic diagram of the program 112 shown in FIG. 2. The program 112 includes an application layer 200, a Layer 3 202, and a Layer 2 206, and is coupled to a Layer 1 218. The Layer 3 202 is used for performing resource control. The Layer 2 includes a Radio Link Control (RLC) layer and a Medium Access Control (MAC) layer, and is used for performing link control. The Layer 1 218 is used for performing physical connection.

In LTE system, when the UE has new uplink data to transmit and there is no Uplink Shared Channel (UL-SCH) resource available, the MAC layer shall trigger a Scheduling Request (SR) procedure to request the network to allocate uplink transmission resources. After the SR procedure is triggered, if the UE has configured Physical Uplink Control Channel (PUCCH) resources, the SR procedure is performed via PUCCH signaling; otherwise, such as the UE has no configured PUCCH resources or the configured PUCCH resources are invalid, for example, the SR procedure is then performed via a Random Access (RA) procedure.

Figure 4:
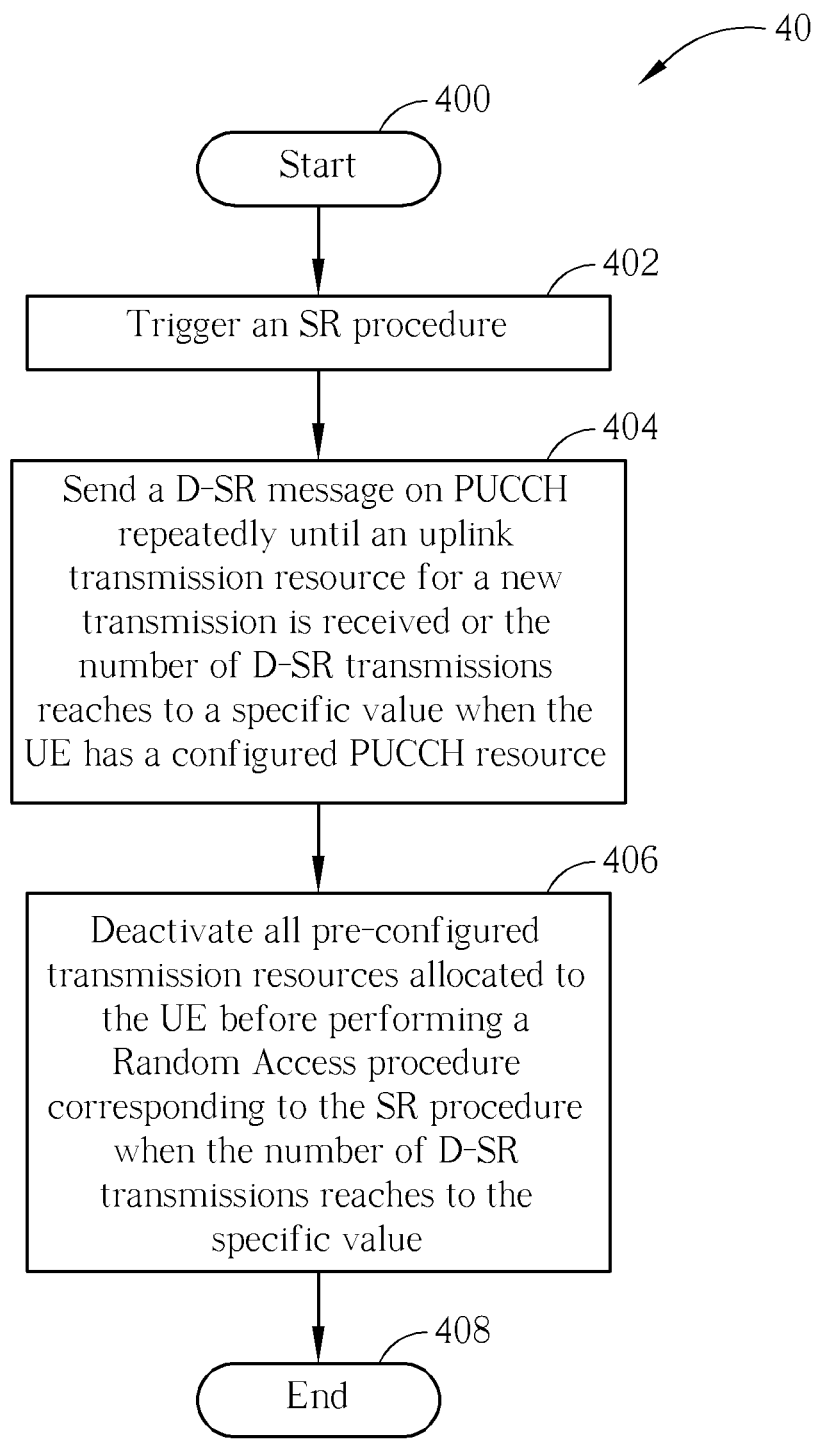
FIG. 4 is a flowchart of a process according to an embodiment of the present invention.

Under such a situation, the embodiment of the present invention provides an SR and RA procedure interaction program 220 in the program 112 for avoiding uplink transmission error or failure of the Random Access procedure. Please refer to FIG. 4, which illustrates a schematic diagram of a process 40 according to an embodiment of the present invention. The process 40 is utilized for improving interaction between an SR procedure and a RA procedure in a UE of a wireless communication system, and can be compiled into the SR and RA procedure interaction program 220. The process 40 includes the following steps:

Step 400: Start.

Step 402: Trigger an SR procedure.

Step 404: Send a Dedicated Scheduling Request (D-SR) message on PUCCH repeatedly until an uplink transmission resource for a new transmission is received or the number of D-SR transmissions reaches to a specific value when the UE has a configured PUCCH resource.

Step 406: Deactivate all pre-configured transmission resources allocated to the UE before performing a Random Access procedure corresponding to the SR procedure when the number of D-SR transmissions reaches to the specific value.

Step 408: End.

According to the process 40, if the UE has the configured PUCCH resource after the SR procedure is triggered, the UE shall periodically transmit the D-SR message on PUCCH until the uplink transmission resource for new transmission is received or the number of D-SR transmissions reaches to the specific value, such as to a pre-defined parameter DSR_TRANS_MAX configured by a Radio Resource Control (RRC) layer. When the number of D-SR transmissions reaches to the specific value, the UE according to the embodiment of the present invention deactivates all pre-configured transmission resources allocated to the UE before performing the RA procedure corresponding to the SR procedure.

When the number of D-SR transmissions reaches to the pre-defined parameter DSR_TRANS_MAX, it indicates uplink transmission of the UE may have some problem, such as the PUCCH resources become invalid or the UE is not synchronized on uplink timing, and thus the D-SR messages sent by the UE cannot be successfully received by the network. In this case, the embodiment of the present invention deactivates all pre-configured transmission resources allocated to the UE, such as Semi-Persistent Scheduling (SPS) resources, before performing the RA procedure corresponding to the SR procedure, to prevent the UE from continuing using the pre-configured resources to perform uplink transmission, such that transmission failure can be avoided. Besides, the embodiment of the present invention can further prevent Message 3 (Msg3) of the RA procedure from misusing the pre-configured resources, to improve the RA procedure failure problem.

Therefore, when the number of D-SR transmissions reaches to the pre-defined parameter DSR_TRANS_MAX and the UE switches to use the RA procedure to transmits a Random Access Scheduling Request (RA-SR) message, except for releasing all configured PUCCH resources, the embodiment of the present invention further deactivates all pre-configured resources allocated to the UE to avoid uplink transmission error or failure of the RA procedure.

Please not that, based on practical demands, the deactivated pre-configured resources can be resumed for use after completion of the RA procedure. Such variation also belongs to the scope of the present invention.

Figure 5:
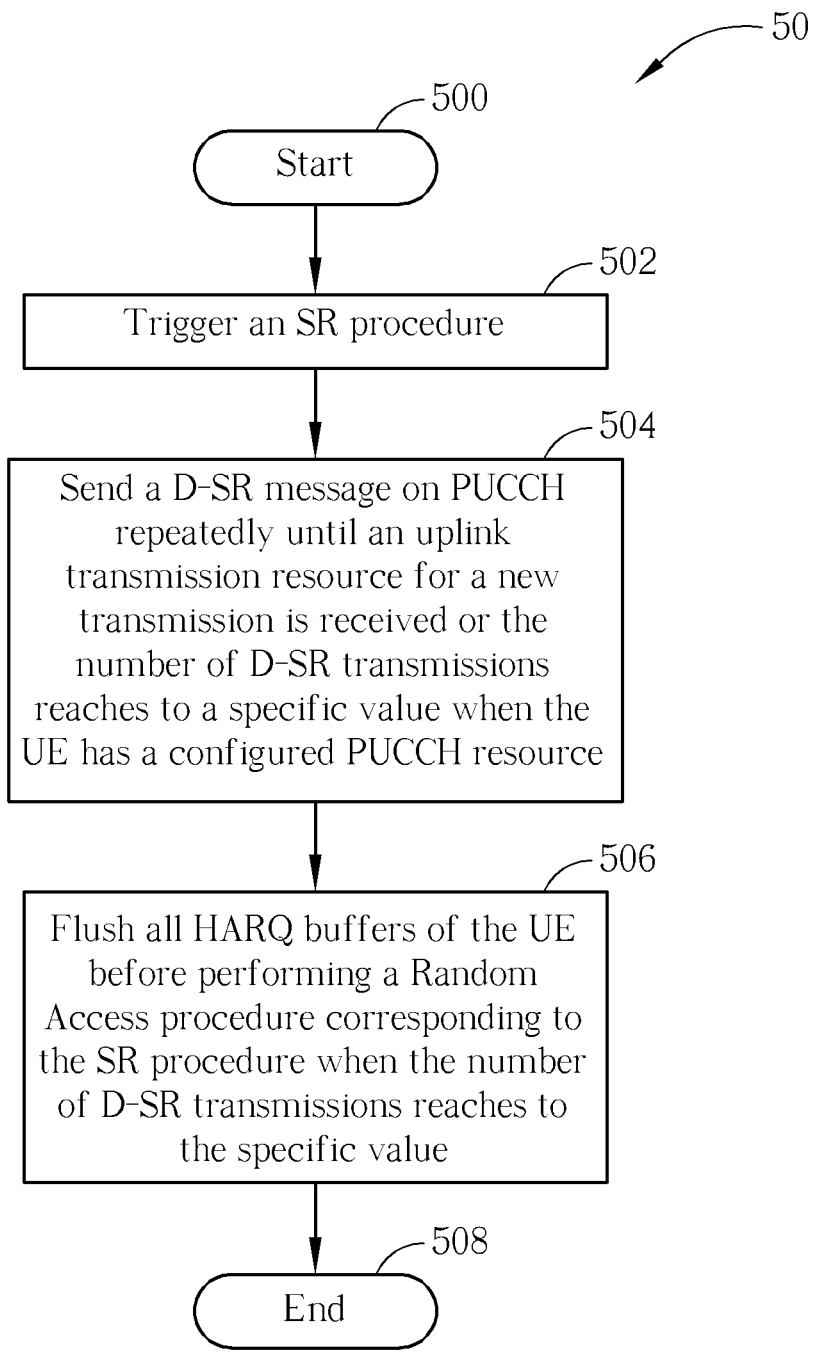
FIG. 5 is also a flowchart of a process according to an embodiment of the present invention.

On the other hand, please refer to FIG. 5, which illustrates a schematic diagram of a process 50 according to an embodiment of the present invention. The process 50 is utilized for improving interaction between an SR procedure and a RA procedure in a UE of a wireless communication system, and can be compiled into the SR and RA procedure interaction program 220. The process 50 includes the following steps:

Step 500: Start.

Step 502: Trigger an SR procedure.

Step 504: Send a D-SR message on PUCCH repeatedly until an uplink transmission resource for a new transmission is received or the number of D-SR transmissions reaches to a specific value when the UE has a configured PUCCH resource.

Step 506: Flush all Hybrid Automatic Repeat request (HARQ) buffers of the UE before performing a Random Access procedure corresponding to the SR procedure when the number of D-SR transmissions reaches to the specific value.

Step 508: End.

Compared to the process 40, when the number of D-SR transmissions reaches to the specific value, it indicates uplink transmission of the UE may have some problem, such as the PUCCH resources become invalid or the UE loses synchronization on uplink timing, and thus the D-SR messages sent by the UE cannot be successfully received by the network. In this case, the embodiment of the present invention flushes all HARQ buffers of the UE to avoid any uplink transmission of the UE, such as non-adaptive retransmission of data in the HARQ buffers or acknowledgement (ACK)/non-acknowledgement (NACK) feedback of received downlink data, such that uplink transmission failure can be prevented. Certainly, the process 40 and 50 can be combined together in another embodiment, and are not limited herein.

Please note that the above embodiments are merely exemplary illustrations of the present invention, and that any operations which release or deactivate the pre-configured resources before performing the RA procedure to avoid resource collision with the UL-SCH resources carried by Message 2 (Msg2) of the RA procedure all belong to the scope of the present invention.

Figure 6:
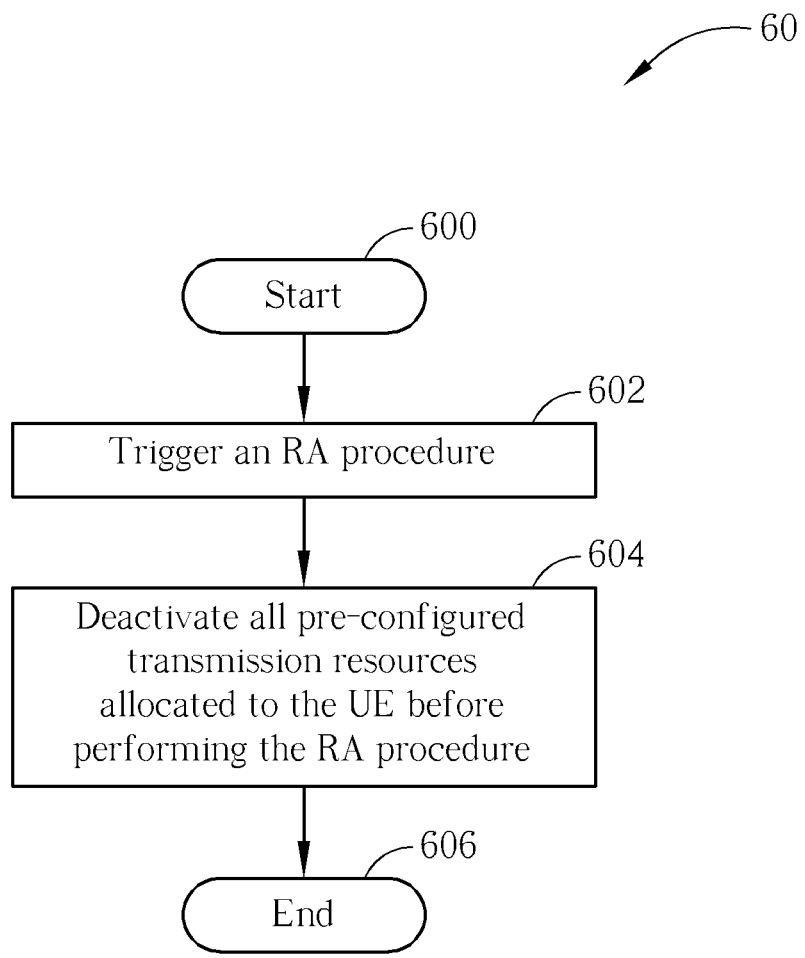
FIG. 6 is also a flowchart of a process according to an embodiment of the present invention.

For example, please refer to FIG. 6, which illustrates a schematic diagram of a process 60 according to an embodiment of the present invention. The process 60 is utilized for improving interaction between an SR procedure and a RA procedure in a UE of a wireless communication system, and can be compiled into the SR and RA procedure interaction program 220. The process 60 includes the following steps:

Step 600: Start.

Step 602: Trigger an RA procedure.

Step 604: Deactivate all pre-configured transmission resources allocated to the UE before performing the RA procedure.

Step 606: End.

According to the process 60, after the RA procedure is triggered, such as triggered by an SR procedure when the UE has no configured PUCCH resources, the UE according to the embodiment of the present invention deactivates all pre-configured resources allocated to the UE before performing the RA procedure, to avoid uplink transmission error or failure of the RA procedure.

In summary, the embodiment of the present invention provides the method for improving interaction between an SR procedure and a RA procedure in a UE of a wireless communication system, to avoid uplink transmission error or failure of the RA procedure when the RA procedure is triggered by the SR procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for improving interaction between a Scheduling Request procedure and a Random Access procedure in a user equipment (UE) of a wireless communication system, the method comprising:

triggering, a Scheduling Request procedure;

sending a Dedicated Scheduling Request (D-SR) message on a Physical Uplink Control Channel (PUCCH) repeatedly until an uplink transmission resource for a new transmission is received or the number of D-SR transmissions reaches to a specific value when the UE has a configured PUCCH resource; and deactivating all pre-configured Semi-Persistent Scheduling (SPS) transmission resources of a SPS operation allocated to the UE before performing a Random Access procedure corresponding to the Scheduling Request procedure when the number of D-SR transmissions reaches the specific value to prevent the UE from misusing the pre-configured SPS transmission resources in a Random Access procedure performed in parallel with the SPS operation so that Random Access procedure failures and uplink transmission errors can be avoided.

2. The method of claim 1, wherein the uplink transmission resource is an Uplink Shared Channel (UL-SCH) resource.

3. The method of claim 1 further comprising: releasing all configured PUCCH resources before performing the Random Access procedure corresponding to the Scheduling Request procedure.

4. The method of claim 1, wherein the specific value is a pre-defined parameter DSR_TRANS_MAX configured by a Radio Resource Control (RRC) layer.

5. A communication device for improving interaction between a Scheduling Request procedure and a Random Access procedure in a user equipment (UE) of a wireless communication system, the communication device comprising:

a processor for executing a program; and a memory coupled to the processor for storing the program;

wherein the program comprises:

triggering a Scheduling Request procedure;

sending a Dedicated Scheduling Request (D-SR) message on a Physical Uplink Control Channel (PUCCH) repeatedly until an uplink transmission resource for a new transmission is received or the number of D-SR transmissions reaches to a specific value when the UE has a configured PUCCH resource; and deactivating all pre-configured Semi-Persistent Scheduling (SPS) transmission resources of a SPS operation allocated to the UE before performing a Random Access procedure corresponding to the Scheduling Request procedure when the number of D-SR transmissions reaches the specific value to prevent the UE from misusing the pre-configured. SPS transmission resources in a Random Access procedure performed in parallel with the SPS operation so that Random Access procedure failures and uplink transmission errors can be avoided.

6. The communication device of claim 5, wherein the uplink transmission resource is an Uplink Shared Channel (UL-SCH) resource.

7. The communication device of claim 5, wherein the program further comprises:

releasing all configured PUCCH resources before performing the Random Access procedure corresponding to the Scheduling Request procedure.

8. The communication device of claim 5, wherein the specific value is a pre-defined parameter DSR_TRANS_MAX configured by a Radio Resource Control (RRC) layer.

* * * * *